US011688066B2

(12) United States Patent
Schmoll

(10) Patent No.: US 11,688,066 B2
(45) Date of Patent: Jun. 27, 2023

(54) METHOD AND APPARATUS FOR RECORDING AND DISPLAYING A THREE-DIMENSIONAL OCT VIDEO

(71) Applicant: Carl Zeiss Meditec AG, Jena (DE)

(72) Inventor: Tilman Schmoll, Vienna (AT)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 17/849,552

(22) Filed: Jun. 24, 2022

(65) Prior Publication Data

US 2022/0414875 A1 Dec. 29, 2022

(30) Foreign Application Priority Data

Jun. 24, 2021 (DE) ...................... 10 2021 116 363.3

(51) Int. Cl.
  *G06T 7/00* (2017.01)
  *G06T 7/30* (2017.01)
  *G06V 10/25* (2022.01)

(52) U.S. Cl.
  CPC .............. *G06T 7/0012* (2013.01); *G06T 7/30* (2017.01); *G06V 10/25* (2022.01); *G06T 2207/10016* (2013.01); *G06T 2207/10101* (2013.01)

(58) Field of Classification Search
  None
  See application file for complete search history.

(56) References Cited

U.S. PATENT DOCUMENTS 8,287,126 B2 * 10/2012 Hauger .................. A61B 3/102
                                                       351/208
10,013,749 B2   7/2018 Charles
(Continued)

FOREIGN PATENT DOCUMENTS

DE      102016104263 A1    9/2016

OTHER PUBLICATIONS

Weiss et al. (Oct. 2020). Processing-aware real-time rendering for optimized tissue visualization in intraoperative 4D OCT. In International Conference on Medical Image Computing and Computer-Assisted Intervention (pp. 267-276). Springer, Cham. (Year: 2020).*

(Continued)

*Primary Examiner* — Samah A Beg
(74) *Attorney, Agent, or Firm* — Ewers IP Law PLLC; Falk Ewers

(57) ABSTRACT

An apparatus for recording and displaying a three-dimensional OCT video includes an OCT system and a data processing unit configured to combine OCT volumes recorded sequentially in time to form a combined OCT volume, to generate display data which facilitate the display of the combined OCT volume, to register a current OCT volume of the OCT volumes, to combine the registered current OCT volume with the previous combined OCT volume to generate an updated combined OCT volume, to carry out a check for combining the registered current OCT volume with the previous combined OCT volume and in respect of which volume regions of the current OCT volume have changed in comparison with the corresponding volume regions of the previous combined OCT volume, and only to combine those volume regions of the current OCT volume that have not changed with the corresponding volume regions of the previous combined OCT volume.

14 Claims, 2 Drawing Sheets

(56) References Cited

U.S. PATENT DOCUMENTS

| | | |
|---|---|---|
| 10,194,888 B2 | 2/2019 | Henderson et al. |
| 2011/0243415 A1* | 10/2011 | Yonezawa ................. G06T 7/12 |
| | | 382/131 |
| 2018/0055355 A1 | 3/2018 | Sarunic et al. |
| 2020/0022575 A1 | 1/2020 | Miller et al. |

OTHER PUBLICATIONS

Office Action issued in German Patent Application No. DE 10 2021 116 363.3, dated Feb. 10, 2022 (from which this application claims priority) and English language translation thereof.

Oscar M. Carrasco-Zevallos et al. in Review of intra-operative optical coherence tomography: technology and applications, Biomed. Opt. Express 8, 1607-1637 (2017).

Decision to grant issued in German Patent Application No. DE 10 2021 116 363.3, dated Jun. 3, 2022 (from which this application claims priority) and English language translation thereof.

* cited by examiner

METHOD AND APPARATUS FOR RECORDING AND DISPLAYING A THREE-DIMENSIONAL OCT VIDEO

CROSS REFERENCE TO RELATED APPLICATIONS

This application claims priority to German patent application DE 10 2021 116 363.3, filed Jun. 24, 2021, the entire content of which is incorporated herein by reference.

TECHNICAL FIELD

The present disclosure relates to a method for recording and displaying a three-dimensional optical coherence tomography (OCT) video. Additionally, the disclosure relates to an apparatus for recording and displaying a three-dimensional OCT video and to a computer-implemented method for generating a three-dimensional OCT video from OCT volumes recorded sequentially in time.

BACKGROUND

OCT recordings facilitate a quick intraoperative assessment of tissue. In particular 4-D OCTs, that is to say OCT devices which facilitate the recording of three-dimensional OCT videos, the latter for example being constructed by merging depth profiles, so-called A-scans, can therefore be of great assistance during an operation since they can facilitate, for example, the visualization of structures, in particular also structures located below the surface, or the identification of tumor boundaries, for instance as described by Oscar M. Carrasco-Zevallos et al. in "Review of intraoperative optical coherence tomography: technology and applications", Biomed. Opt. Express 8, 1607-1637 (217).

The OCT systems described by Oscar M. Carrasco-Zevallos et al. achieve recording rates of up to 10 volumes per second. To display a three-dimensional OCT video in real time, the individual OCT volumes of the three-dimensional OCT video should be recorded and displayed with a frame rate of more than 10 volumes per second, ideally at least 24 volumes per second. This requirement leads to a significant limitation in the recording time available for recording an OCT volume. To remain within the available recording time, the OCT volume must either have small dimensions or a low voxel density, leading to a reduction in the resolution of the 4-D OCT. Since a reduction in the dimensions or in the resolution of the OCT volume usually is out of the question, the high recording rate generally is to the detriment of the recording time available for recording a one-dimensional depth profile (A-scan), which is typically composed of a plurality of recording points (pixels), which in turn leads to a low signal-to-noise ratio of the recorded OCT volumes.

US 2020/0022575 A1 describes an OCT system in which individual volumes are recorded and registered in three dimensions. In certain variants of this OCT system, averaging can be implemented over more than 100 OCT volumes in order to increase the clarity of the image. As a result, volume frame rates of up to 10 volumes per second can be realized. The signal-to-noise ratio is increased in the process as a result of combining up to 100 OCT volumes. However, the rate of 10 volumes per second is too low to provide a smooth OCT video.

U.S. Pat. No. 10,013,749 B2 describes a method for increasing the resolution in an OCT video, the OCT images also being able to be three-dimensional. To increase the resolution, the recorded OCT images are registered in relation to a high-resolution OCT image and subsequently combined with the latter. This allows a high-resolution real-time image to be displayed.

US 2018/0055355 A1 describes the averaging of OCT images for the purposes of increasing the signal-to-noise ratio, also for the recording of 3-D data.

Although the aforementioned related art allows improvements in the signal-to-noise ratio and the generation of high-resolution OCT volumes, the methods and devices described therein nevertheless are unable to record and display three-dimensional OCT videos with frame rates of more than 10 volumes per second, ideally at least 24 volumes a second, and a good signal-to-noise ratio.

SUMMARY

It is therefore an object of the present disclosure to provide a method and an apparatus for recording a three-dimensional OCT video which allow the generation of three-dimensional OCT videos with the same signal-to-noise ratio as in the related art but at a higher rate of volumes per second in comparison with the prior art or which allow the generation of three-dimensional OCT videos with an improved signal-to-noise ratio over the prior art but at the same time have the same rate of volumes per second as in the related art. In particular, the method can be used intraoperatively, that is to say the three-dimensional OCT videos are recorded during a surgical intervention in order to represent the operation site.

The aforementioned object is achieved by a method for recording and displaying a three-dimensional OCT video, by an apparatus for recording and displaying a three-dimensional OCT video, and by a computer-implemented method for generating a three-dimensional OCT video as described herein.

According to a first aspect of the disclosure, a method is provided for recording and displaying a three-dimensional OCT video, in which OCT volumes of an object region of an observation object, for example of a tissue region of human or animal tissue, are recorded sequentially in time and are combined to form a combined OCT volume, and in which the combined OCT volume is displayed. In the process, a current OCT volume of the OCT volumes recorded sequentially in time is registered in relation to the previous combined OCT volume and the registered current OCT volume is combined with the previous OCT volume in order to produce an updated combined OCT volume. The updated combined OCT volume is then displayed. According to an aspect of the disclosure, a check is carried out for the purposes of combining the current OCT volume with the previous combined OCT volumes and is carried out in respect of which volume regions of the registered current OCT volume have changed in comparison with the corresponding volume regions of the previous combined OCT volume. Only those volume regions of the registered current OCT volume that have not changed are combined with the corresponding volume regions of the previous combined OCT volume. In this case, individual voxels or a plurality of contiguous voxels may serve as volume regions.

By contrast, in the related art the respective current OCT volumes are either combined in their entirety with the previous combined OCT volume, or are entirely discarded. If sections of the imaged object region have changed, this leads either to a deterioration of the image sharpness in the volume regions of the OCT volume that image the sections with the changes if the current OCT volume is combined with the previous combined OCT volume or to no increase in the signal-to-noise ratio if the current OCT volume is completely discarded. In the method according to an aspect of the disclosure, by contrast, there is an increase in the signal-to-noise ratio in the volume regions not affected by the changes as a result of the partial combination of the current OCT volume with the previous combined OCT volume, without there being a deterioration in the image sharpness in the volume regions affected by the changes. Overall, this results in an improvement in the image quality without a longer recording period being required for this improvement in the image quality.

Those volume regions of the previous combined OCT volume in respect of which the corresponding volume regions of the registered current OCT volume have changed can be replaced by the corresponding volume regions of the registered current OCT volume. In this way, each volume region of the updated combined OCT volume obtains a current representation of a section of the imaged object region. If the volume regions of the previous combined OCT volume replaced by volume regions of the registered current OCT volume then remain unchanged over a certain period of time, high signal-to-noise ratios can quickly be re-obtained for these volume regions as well. This can generate OCT videos with a high signal-to-noise ratio, in particular for object regions of observation objects which are not subject to constant changes.

To prevent possibly wrong, outdated views of a volume region being displayed in the combined OCT volume, there is the option of identifying or deleting volume regions in the previous combined OCT volume which were neither replaced by volume regions of a registered current OCT volume nor combined with volume regions of the registered current OCT volume over a predetermined time period. By way of example, if a movement of the object region leads to sections of the object region displayed in a combined OCT volume no longer being contained in the subsequent current OCT volumes, it is no longer possible to determine whether or not the volume regions which represent these sections of the object region have changed. Moreover, they can be neither updated nor combined with volume regions of a current OCT volume, which is why the data of these volume regions can become outdated. Identifying or deleting these volume regions in the three-dimensional OCT video therefore indicates to the user that the data underlying these volume regions of the OCT video are outdated and therefore no longer reliable. Making a decision on the basis of outdated or unreliable data can be avoided in this way. If new data are required for the corresponding sections of the object region, then the recording OCT system can be displaced accordingly such that these sections of the object region are once again contained in the current recorded OCT volume.

To increase the resolution of the three-dimensional OCT video, it is possible to use an OCT volume which has at least one of the following properties as initial OCT volume, in relation to which the first recorded OCT volume is registered and with which the first recorded OCT volume is combined to form the first combined OCT volume:
 a longer recording duration than the individual OCT volumes of the OCT volumes recorded sequentially in time,
 a representation of a larger object region of the observation object, i.e., a volume with a larger lateral extent and/or a larger imaged depth range, than the individual OCT volumes of the OCT volumes recorded sequentially in time, and
 a higher resolution than the individual OCT volumes of the OCT volumes recorded sequentially in time.

Registration with such an initial OCT volume offers the option of providing a high signal-to-noise ratio right at the start of the recording of the OCT volumes sequential in time, and/or of representing a larger object region of the observation object and/or of obtaining a higher resolution than the individual OCT volumes of the OCT volumes recorded sequentially in time. In this case, the initial OCT volume may be recorded using a different OCT system than the OCT system used to record the OCT volumes recorded sequentially in time, for instance using a diagnostic OCT device that may have different specifications to the OCT device used to record the three-dimensional OCT volumes, for example a larger imaging volume, a higher resolution, etc.

If it images a larger object region of the observation object than the OCT volumes recorded sequentially in time, an initial OCT volume offers the option of using a comparison of structures of the object region of the observation object depicted in the initial OCT volume with structures of the object regions of the observation object depicted in the OCT volumes recorded sequentially in time to determine whether and how the respective current OCT volumes shift relative to one another. The determined displacement can then form a basis for the registration.

Should the OCT system include a probe whose tip is guided to the object region to be recorded for the purposes of recording the OCT volumes, there moreover is the option, for registration purposes, to capture relative movements between the object region of the observation object and the probe tip, and to use this as a basis for the registration. By way of example, the relative movement can in this case be determined by virtue of the probe tip and an object section containing the object region from which the three-dimensional OCT videos are obtained being imaged together in an overview image. That is to say that a camera, for example, can be used to record an overview image which images both the probe tip and an object section containing the object region from which the three-dimensional OCT videos are obtained. Then, the relative position of the probe tip relative to the object region can be determined from the overview image, for example with triangulation-based methods should the overview image be a stereoscopic overview image. If the position of the tip of the probe is unchanged relative to the remaining sections of the probe, it is possible to derive the position and orientation of the probe tip from the position of any section of the probe and the orientation of the probe, and so capturing the position of the probe tip itself is not a necessary precondition for determining the relative position of the probe tip relative to the object region.

According to a second aspect of the disclosure, an apparatus is provided for recording and displaying a three-dimensional OCT video. The apparatus includes an OCT system, which facilitates time-sequential recording of OCT volumes for an object region of an observation object, for example a tissue region of human or animal tissue, and a data processing unit that is configured to combine OCT volumes recorded sequentially in time to form a combined OCT volume and to generate display data which facilitate the display of the combined OCT volume. The data processing unit is moreover configured to register a current OCT volume of the OCT volumes recorded sequentially in time in relation to the previous combined OCT volume and to combine the registered current OCT volume with the previous combined OCT volume in order to produce an updated combined OCT volume. Moreover, the data processing unit is configured to generate display data which facilitate the display of the updated combined OCT volume. According to an aspect of the disclosure, the data processing unit is configured to carry out a check for the purposes of combining the registered current OCT volume with the previous combined OCT volumes and in respect of which volume regions of the registered current OCT volume have changed in comparison with the corresponding volume regions of the previous combined OCT volume, and only to combine those volume regions of the registered current OCT volume that have not changed with the corresponding volume regions of the previous combined OCT volume.

The apparatus according to an aspect of the disclosure allows the method according to an aspect of the disclosure to be carried out, and hence the realization of the advantages described in relation to the method according to an aspect of the disclosure. In particular, the apparatus according to an aspect of the disclosure can find use in the realization of three-dimensional OCT videos with a high frame rate and/or a good signal-to-noise ratio. In this case, it is advantageous if the data processing unit is configured to replace those volume regions of the previous combined OCT volume in respect of which the corresponding volume regions of the registered current OCT volume have changed with the corresponding volume regions of the registered current OCT volume. The apparatus according to an aspect of the disclosure can be used, in particular, to record and display three-dimensional OCT videos of the operation site during a surgical intervention, that is to say intraoperatively.

To avoid OCT volumes with outdated data not reflecting the current state of the observation object being displayed to the user, the data processing unit can be configured to identify or delete volume regions of the previous combined OCT volume which were neither combined with volume regions of a registered current OCT volume nor replaced by volume regions of a registered current OCT volume over a predetermined time interval. Such volume regions typically image sections of the object region which are not imaged in the currently recorded OCT volumes, for instance because the OCT system and the object region have been displaced relative to one another. Those volume regions which represent the sections of the object region currently no longer imaged no longer have any guarantees that they still reflect the current state of the corresponding section of the object region. By identifying those volume regions or deleting those volume regions it is possible to avoid the user making decisions on the basis of unreliable data.

In an advantageous development of the apparatus according to an aspect of the disclosure, the data processing unit is configured to use an OCT volume which has at least one of the following properties as initial OCT volume, in relation to which the first recorded OCT volume is registered and with which the first recorded OCT volume is combined to form the combined OCT volume:
  a longer recording duration than the individual OCT volumes of the OCT volumes recorded sequentially in time,
  a representation of a larger object region of the observation object than the individual OCT volumes of the OCT volumes recorded sequentially in time, for instance on account of a larger lateral extent of the representation and/or a larger depth range covered by the representation, and
  a higher resolution than the individual OCT volumes of the OCT volumes recorded sequentially in time.

At least one of the following advantages can be obtained using this embodiment: The first combined OCT volume already has a high signal-to-noise ratio.

At the outset, the combined OCT volume can represent a larger volume region than is possible using a single OCT volume.

A higher resolution is achieved than that of the individual OCT volumes.

A second, different OCT system to the OCT system used to record the OCT volumes recorded sequentially in time may be available for the purposes of recording the initial OCT volume. This OCT system may have a higher resolution and/or image a larger volume region than the OCT system used to record the individual OCT volumes. By way of example, a diagnostic OCT system used to obtain diagnostic data pre-surgery can be used as second OCT system. Accordingly, the initial OCT volume can be a diagnostic OCT volume, that is to say an OCT volume recorded pre-surgery for diagnostic purposes.

In a further exemplary embodiment of the apparatus according to an aspect of the disclosure, the data processing unit is configured to determine a position of the respective recorded OCT volume relative to the initial OCT volume on the basis of a comparison between structures of the object region represented in the initial OCT volume and structures of the object regions represented in the OCT volumes recorded sequentially in time, and to use the determined position as a basis for the registration. In this way, it is possible to dispense with a tracking system for monitoring the positions of the object region and OCT system relative to one another. Alternatively or in addition, there is the option of the apparatus according to an aspect of the disclosure containing a system for detecting a relative movement between the object region and the OCT system used to record the OCT volumes recorded sequentially in time, and the data processing unit being configured to use the detected relative movements as a basis for the registration. A tracking system which measures the positions of the object region and the OCT system in a coordinate system and determines the relative movements therefrom may be present as such are system for determining a relative movement. Should the OCT system include a probe whose tip is guided to the object region to be recorded for the purposes of recording the OCT volumes, there is the option of using an optical observation device, for instance a surgical microscope, or an overview camera to record an overview image in which both the probe tip and an object section containing the object region from which the three-dimensional OCT videos are obtained are imaged, and of determining the relative position of the probe tip relative to the object region on the basis of the overview image, as described in relation to the method according to an aspect of the disclosure.

According to yet a further aspect of the present disclosure, a computer-implemented method is provided for generating a three-dimensional OCT video. In the computer-implemented method, OCT volumes recorded sequentially in time are received for an object region of an observation object, for example a tissue region of human or animal tissue, and are combined to form a combined OCT volume. In the process, a current OCT volume is registered in relation to the previous combined OCT volume and the registered current OCT volume is combined with the previous combined OCT volume in order to obtain an updated combined OCT volume. According to an aspect of the disclosure, a check is carried out for the purposes of combining the registered current OCT volume with the previous combined OCT volumes and is carried out in respect of which volume regions of the registered current OCT volume have changed in comparison with the corresponding volume regions of the previous combined OCT volume. Only those volume regions of the registered current OCT volume that have not changed are combined with the corresponding volume regions of the previous combined OCT volume. Those volume regions of the previous combined OCT volume in respect of which the corresponding volume regions of the registered current OCT volume have changed can be replaced by the corresponding volume regions of the registered current OCT volume. Moreover, volume regions of the updated combined OCT volume which were not combined with volume regions of a registered current OCT volume or replaced by volume regions of a registered current OCT volume over a predetermined time interval can be identified in, or deleted from, the updated combined OCT volume.

The computer-implemented method according to an aspect of the disclosure allows the retrofitting, with software, of previous OCT systems into apparatuses according to an aspect of the disclosure for recording and displaying three-dimensional OCT videos and hence allows the method according to an aspect of the disclosure for recording and displaying three-dimensional OCT videos to be carried out. The computer-implemented method according to an aspect of the disclosure in this case facilitates the realization of the advantages described in relation to the method according to an aspect of the disclosure for recording and displaying a three-dimensional OCT video.

Further features, properties and advantages of the present disclosure will become apparent from the following description of exemplary embodiments with reference to the accompanying figures.

BRIEF DESCRIPTION OF THE DRAWINGS

The disclosure will now be described with reference to the drawings wherein.

DESCRIPTION OF EXEMPLARY EMBODIMENTS

The present disclosure is explained in detail below on the basis of FIGS. 1 and 2, which show exemplary embodiments of the disclosure. However, a person skilled in the art recognizes that modifications of the exemplary embodiments depicted in FIGS. 1 and 2 are possible.

Figure 1:
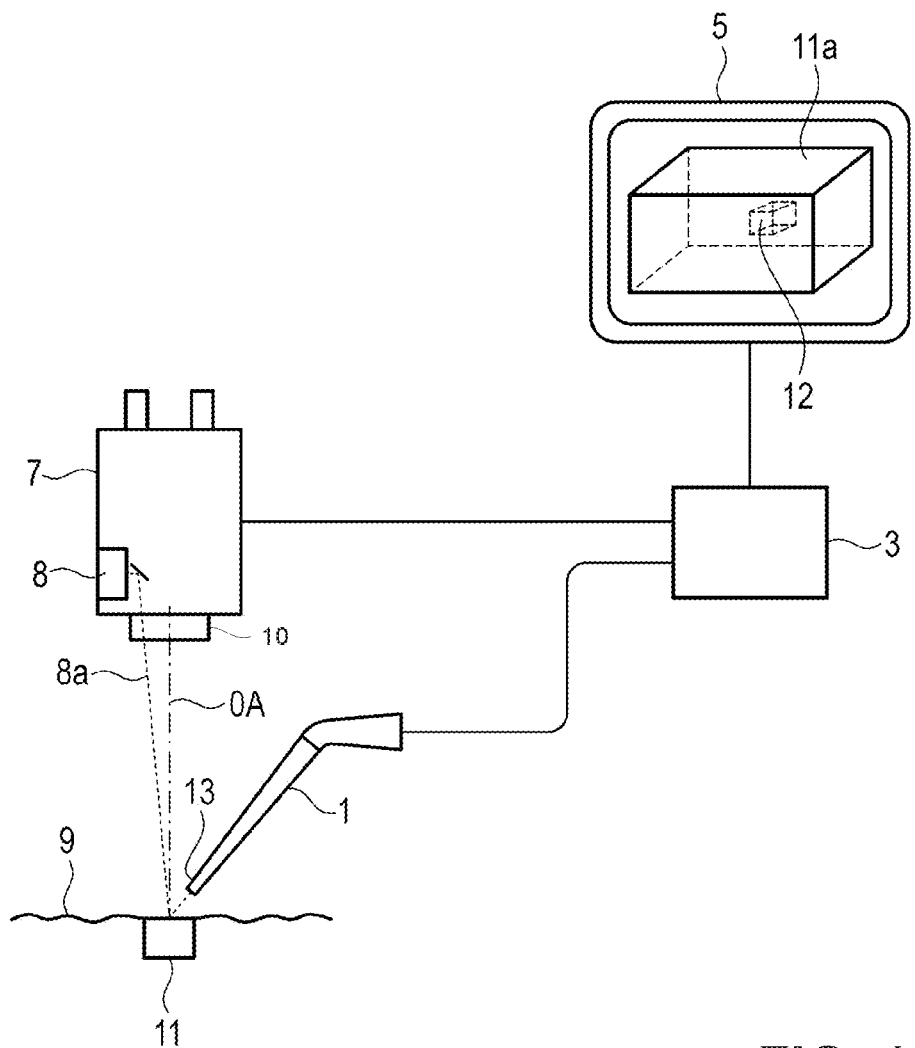
FIG. 1 shows an apparatus for recording and displaying a three-dimensional OCT video.
Figure 2:
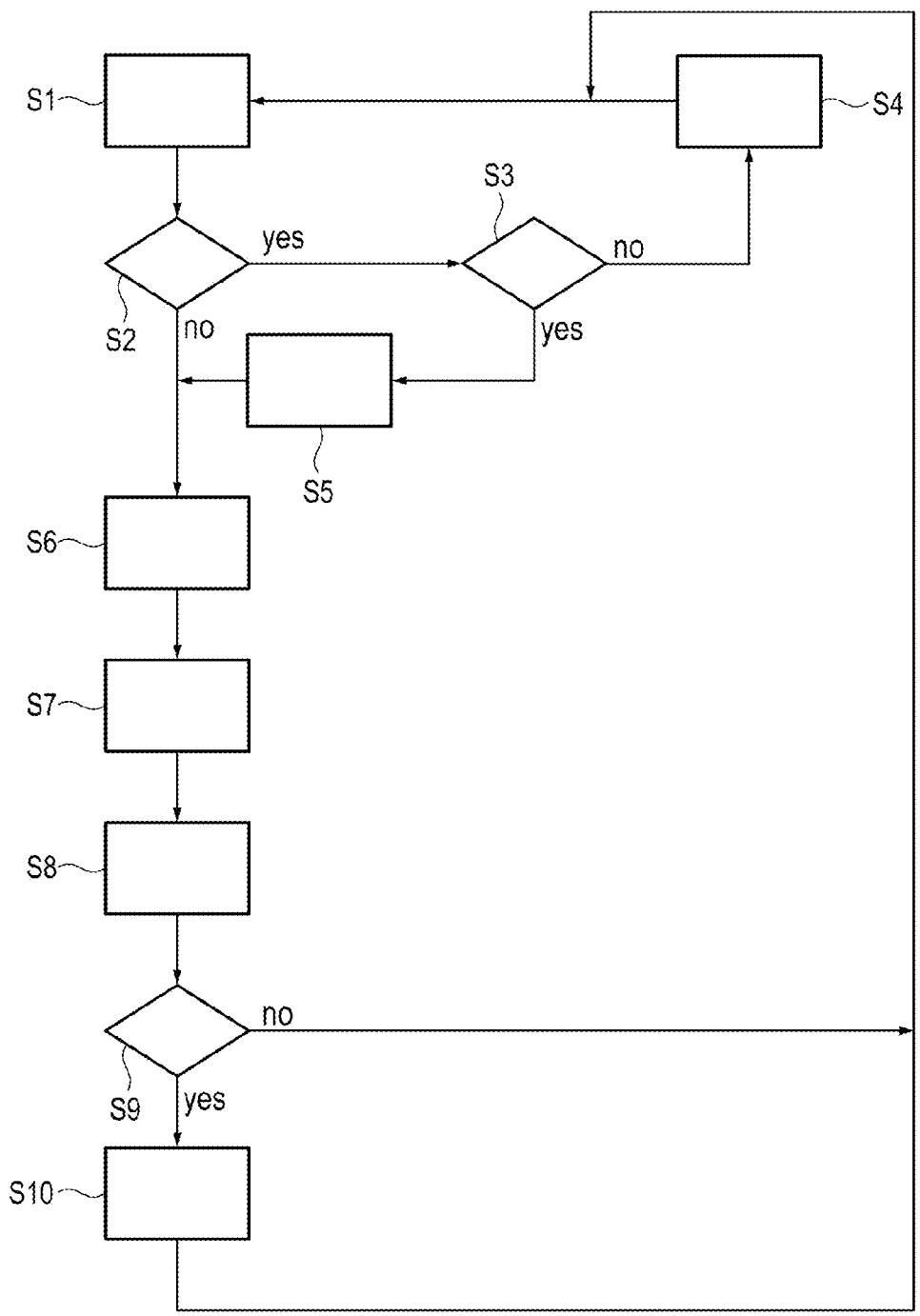
FIG. 2 shows a flowchart of a method for recording and displaying a three-dimensional OCT video.

FIG. 1 shows an exemplary embodiment of an apparatus for recording and displaying a three-dimensional OCT video. In the present exemplary embodiment, the apparatus includes an optional hand-guided OCT system having a probe 1 including a probe tip 13 to be guided to an object region 11 of the observation object 9 to be imaged, a data processing unit 3, a display 5 and a surgical microscope 7. Moreover, the apparatus in the present exemplary embodiment includes an OCT system 8 which is integrated in the surgical microscope 7 and whose beam path 8a runs through an edge region of the main objective 10 of the surgical microscope 7 at a small angle relative to the optical axis OA of the main objective 10. Alternatively, the beam path of the OCT system 8 may also be guided along the optical axis OA of the main objective 10. Moreover, the OCT system may also be securely fastened to the outer side of the surgical microscope 7 rather than being integrated into said surgical microscope 7 such that its position and orientation does not change relative to the surgical microscope 7 in the case of a movement of said surgical microscope 7. The beam path of an OCT system 8 fastened to the outer side of the surgical microscope 7 would run at a larger angle relative to the optical axis OA of the main objective 10 than would be the case for an OCT system 8 integrated into said surgical microscope 7 if the beam path is not coupled into the surgical microscope 7 and guided through the main objective 10 there. Within the scope of the disclosure, however, there is also the option of the hand-guided OCT system with the probe 1 being the only OCT system of the apparatus. Details regarding the structure and functionality of OCT systems can be gathered, for example, from Oscar M. Carrasco-Zevallos et al. in "Review of intraoperative optical coherence tomography: technology and applications", Biomed. Opt. Express 8, 1607-1637 (217). Hence, reference is made to this document in respect of the structure and functionality of OCT systems.

In the exemplary embodiment, three-dimensional OCT volumes of an object region 11 of the observation object 9 are recorded sequentially in time using the OCT system 8 that is integrated into the surgical microscope 7 or using the hand-guided OCT system. In this case, the object region 11 is an object volume of the observation object 9 and the three-dimensional OCT volumes are three-dimensional images of the object volume 11. The observation object is a region of human tissue, and so the object volume is a tissue volume 11, within the scope of the exemplary embodiment.

In the present exemplary embodiment, the OCT volume is put together from a multiplicity of A-scans, with the position of the A-scans being offset laterally, i.e., perpendicular to the direction of the depth scan, in the observation object 9 with scanning apparatus in order to image a section of the observation object 9. In this case, the recording duration of the individual A-scans is measured such that at least 10 OCT volumes can be recorded per second, typically at least 20 OCT volumes per second and ideally at least 24 OCT volumes per second. Since a high frame rate leads to only a very short period of time being available for the recording of each individual A-scan, there are tight limits on the obtainable signal-to-noise ratios when recording an individual A-scan of the OCT volumes recorded sequentially in time. The signal-to-noise ratio reduces with an increasing frame rate for a given extent of the tissue volume 11 to be imaged. Likewise, the signal-to-noise ratio given a fixed frame rate worsens with increasing dimensions of the volume to be imaged. Only relatively poor signal-to-noise ratios can be realized with the individual A-scans especially if a large tissue volume 11 is intended to be imaged at a high frame rate. The OCT volumes recorded sequentially in time are transmitted from the OCT system 8 to the data processing unit 3. In addition to the time-sequential OCT volumes, an overview video is recorded by the surgical microscope 7 in the exemplary embodiment and transmitted to the data processing unit 3. In addition to a section of the observation object 9 containing the tissue volume 11, this overview video also shows the probe tip 13 of the hand-guided OCT system, provided the latter is present and used.

The OCT volumes recorded sequentially in time that are received by the OCT system are processed by the data processing unit 3 so as to display an OCT video. In the process, the OCT volumes recorded sequentially in time are not only displayed sequentially in time on the display 5 to be subsequently discarded but are combined to form a combined OCT volume which then is displayed on the display 5 as a frame 11a of the three-dimensional OCT video. In this way, a three-dimensional OCT video that represents the tissue volume 11 can be displayed on the display 5 with an improved signal-to-noise ratio.

A monitor is used as a display 5 in the present exemplary embodiment, said monitor displaying the OCT video formed from the OCT volumes recorded sequentially in time. In this case, the OCT volume can display outer volume regions with a certain transparency in order to render inner volume regions visible. However, there is also the possibility of stereoscopic images being presented on the monitor, the latter being observed using shutter glasses or polarization glasses. Moreover, there is the option of providing a head-mounted display in addition or as an alternative to a monitor, the former in particular having a respective display for the right and the left eye such that there can be a three-dimensional image representation. In this case it is also possible to present certain volume regions of the recorded tissue volume 11 transparently in order to render inner volume regions visible. However, a person skilled in the art recognizes that the present disclosure is not restricted to certain ways of representing the OCT video.

The apparatus for recording and displaying a three-dimensional OCT video can be used in particular for intraoperative production and display of an OCT video, that is to say for example for producing and displaying an OCT video during a surgical intervention.

The processing of the received OCT volumes by the data processing unit 3 is described below on the basis of the flowchart shown in FIG. 2. This flowchart shows how the OCT volumes recorded by the OCT system 8, or optionally recorded by the hand-guided OCT system, and received by the data processing unit 3, are combined for the display on the monitor 5. The rate with which the data processing unit 3 receives the OCT volumes from the OCT system 8 depends on the recording rate of the OCT volumes recorded sequentially in time, said rate being at least 10 OCT volumes per second, typically at least 20 OCT volumes per second and ideally at least 24 OCT volumes per second in the present exemplary embodiment in order to be able to produce a smooth OCT video. So that a live video, that is to say a video in real time, can be generated from the OCT volumes recorded sequentially in time, the data processing unit 3 in the present exemplary embodiment therefore receives and processes at least 10 OCT volumes per second, typically at least 20 OCT volumes per second and ideally at least 24 OCT volumes per second.

In a first step S1, the data processing unit 3 receives a current OCT volume from the OCT system 8 or optionally from the hand-guided OCT system. In the exemplary embodiment, the steps following step S1 that are described below are carried out so quickly that they have been completed when the next OCT video is received.

In step S2, the data processing unit 3 checks whether the received OCT volume is the first OCT volume, that is to say the first frame 11a of the OCT video. If this is the case, the method continues to step S3, in which the data processing unit 3 checks whether an initial OCT volume is present. By way of example, such an initial OCT volume can be an OCT volume recorded using the OCT system 8 or using the hand-guided OCT system, said OCT volume having a longer recording duration per A-scan than the individual OCT volumes of the OCT video. In this way, it has a higher signal-to-noise ratio than the individual OCT volumes of the OCT video. In addition or alternatively, it may have a higher spatial resolution than the individual OCT volumes of the OCT video and/or a larger represented volume region than the individual OCT volumes of the OCT video. A larger represented volume region of the initial OCT volume can be achieved by virtue of the fact that it images a larger lateral section of the tissue region 11 and/or a larger depth range of the tissue region 11. The initial OCT volume need not necessarily have been recorded using the OCT system 8 integrated into the surgical microscope 7 or using the hand-guided OCT system, but may have been recorded, for example, prior to surgery using a diagnostic OCT system. In the present exemplary embodiment use is made of an initial OCT volume which images a larger volume region of the observation object 9 than the individual OCT volumes of the OCT video with a higher spatial resolution than the individual OCT volumes of the OCT video.

If a lack of initial OCT volume is determined in step S3, the method advances to step S4 in which the current OCT volume is defined to be the first combined OCT volume, that is to say the first frame 11a of the three-dimensional OCT video. The method then advances to step S1. By contrast, should the presence of an initial OCT volume be determined in step S3, as is the case in the present exemplary embodiment, the initial OCT volume is defined as first combined OCT volume, that is to say as a first frame 11a of the three-dimensional OCT video, in step S5 and the method advances to step S6. If the current OCT volume is determined not to be the first OCT volume of the OCT video in step S2, the method advances directly to step S6.

The current OCT volume is registered in step S6. Each recorded OCT volume of the OCT video is registered in relation to the initial OCT volume within the scope of the exemplary embodiment. This is particularly sensible if the initial OCT volume images a larger volume region of the tissue region 11 than the individual OCT volumes of the OCT video since the position of the respective current OCT volume in the larger initial OCT volume can be determined on the basis of specific features of the tissue region.

If a hand-guided OCT system with a probe 1 is used instead of the OCT system 8 that is integrated into the surgical microscope, the registration, in an alternative variant thereof, can be undertaken on the basis of an overview image obtained by the surgical microscope 7. The overview image, which is a stereoscopic overview image in particular, also shows the probe 1 of the hand-guided OCT system, or at least the probe tip 13, in addition to the tissue region 11 imaged by the hand-guided OCT system. Then, the relative position of the probe tip 13—and hence the relative position of the tissue region 11 currently imaged by the hand-guided OCT system—is determined with a triangulation-based method within the larger tissue section depicted in the overview image. In this case, the relative position of the probe tip 13, for example, can be determined in each case for the first A-scan of a current OCT volume. The relative position of the remaining A-scans relative to the first A-scan of the current OCT volume can then be derived from the known scanning characteristic of the scanner used to laterally scan the observation object 9 for the purposes of recording the current OCT volume.

In a further alternative variant of the registration, the current OCT volume is displaced and optionally rotated on the basis of certain features of the tissue region 11 depicted therein, which features are able to be identified both in the current OCT volume and in the combined OCT volume, in such a way that the features are made to correspond in terms of their position and orientation.

Finally, there is also the option of monitoring the relative position of the utilized OCT system and the relative position of the observation object with a tracking system and of determining the position of the tissue region 11 in the observation object 9 currently imaged by the OCT system from the detected relative positions.

Following the registration, those volume regions of the registered current OCT volume in which the image representation of the tissue region 11 differs from its image representation in the combined OCT volume, i.e., from the previously depicted frame 11a of the three-dimensional OCT video, are identified in step S7. That a volume region in the registered current OCT volume differs from the corresponding volume region 12 in the combined OCT volume (frame 11a) can for example be identified due to the fact that the intensities of the voxels in this volume region in the registered current OCT volume differ significantly from the normalized intensities of the voxels in this volume region in the combined OCT volume, the fact that the edges in the intensities of the voxels shift, etc.

After the volume regions in which the image representation of the tissue region 11 in the registered current OCT volume differs from its image representation in the previous combined OCT volume (previously depicted frame 11a) have been determined in step S7, the method advances to S8, in which the combined OCT volume is updated. In the present exemplary embodiment, the update is implemented by virtue of the fact that, in those volume regions 12 of the previous combined OCT volume in which the representation of the tissue region 11 does not differ from the representation of the tissue region 11 in the corresponding volume regions of the registered current OCT volume, the intensities of the voxels of the registered current OCT volume are added to the intensities of the voxels of the previous combined OCT volume and a normalization is subsequently carried out in order to keep the image brightness constant. In those volume regions 12 of the previously combined OCT volume (previously depicted frame 11a) for which differences have been determined in relation to the registered current OCT volume, the voxels of the previous combined OCT volume are replaced by the voxels of the registered current OCT volume.

An updated combined OCT volume, that is to say an updated frame 11a of the three-dimensional OCT video which may have a high signal-to-noise ratio at least in those volume regions in which no changes were determined in step S7 since these volume regions are formed from a combination of the voxels of a plurality of individual OCT volumes of the OCT video, is obtained in step S8 by the described procedure. Particularly if changes generally occur only very sporadically, the updated combined OCT volume has a high signal-to-noise ratio everywhere for most of the time. Only for a very short period of time after a change in a volume region 12 of the combined OCT video does this volume region have a relatively low signal-to-noise ratio, as also exhibited by the individual OCT volumes of the OCT video.

In the next step, step S9, a check is carried out whether volume regions 12 that were neither combined with volume regions of a registered current OCT volume nor replaced by volume regions of a registered current OCT volume for a predetermined period of time are present in the updated combined OCT volume. Should the presence of such volume regions be determined in step S9, the method advances to S10, in which these volume regions are identified. Should the OCT video be a color video, there is for example the option of representing these volume regions in grayscale rather than in color or using a color that otherwise does not occur in the OCT video. Alternatively, there is the option of deleting from the current representation of the OCT video volume regions in the updated combined OCT volume that were neither combined with volume regions of a registered current OCT volume nor replaced by volume regions of a registered current OCT volume for a predetermined period of time.

From step S10, the method returns to step S1 by virtue of the described procedure being repeated for a new current OCT volume. Should, in the updated combined OCT volume, no volume regions that were neither combined with volume regions of a registered current OCT volume nor replaced by volume regions of a registered current OCT volume for a predetermined period of time be determined as present in step S9, the method returns directly from step S9 to step S1.

The method described with reference to FIG. 2 can be carried out so quickly that the respective updated combined OCT volumes (frames 11a) can be displayed by the display 5 at a rate of at least 10 frames 11a per second, typically at least 20 frames 11a per second and ideally at least 24 frames 11a per second. Despite the high frequency with which these updated combined OCT volumes are depicted and despite the restricted recording duration for the A-scans of the individual OCT volumes of the OCT video connected therewith, an OCT video with a high signal-to-noise ratio can be displayed on the display 5. Moreover, the use of a high-resolution initial OCT volume facilitates the representation of the OCT video with a resolution that has been increased in relation to the individually recorded OCT volumes of the OCT video.

If the tissue region is tissue imaged in vivo, movements of the tissue lead to the individual OCT volumes representing different sections of the tissue at their edges. This can be used to generate an OCT video in which the combined OCT volumes show a larger section of the tissue than the individual recorded OCT volumes. Volume regions of a current OCT volume that represent tissue sections that were not represented in the previously recorded OCT volume, and which are therefore not represented in the combined OCT volume either are identified as differences in step S7 and the voxels of the registered current OCT volume, which show the object sections not imaged in the previous combined OCT volume, are added to the previous combined OCT video in step S8. In this way, the tissue region 11 of the observation object 9 represented in the OCT video increases over time in the case of a moving tissue region 11.

The present disclosure has been described in detail on the basis of exemplary embodiments. A person skilled in the art recognizes, however, that deviations from the exemplary embodiments described are possible. Therefore, the present disclosure is not intended to be limited by the exemplary embodiments but rather only by the appended claims.

What is claimed is:

1. A method for recording and displaying a three-dimensional OCT video, in which OCT volumes of an object region of an observation object are recorded sequentially in time and are combined to form a combined OCT volume, and the combined OCT volume is displayed, the method comprising:

registering a current OCT volume of the OCT volumes recorded sequentially in time;

combining the current OCT volume with a previous combined OCT volume to generate an updated combined OCT volume;

displaying the updated combined OCT volume;

carrying out a check for combining the current OCT volume with the previous combined OCT volume, wherein the check is carried out in respect of which volume regions of the current OCT volume have changed in comparison with corresponding volume regions of the previous combined OCT volume;

combining only the volume regions of the current OCT volume that have not changed with the corresponding volume regions of the previous combined OCT volume; and replacing the volume regions of the previous combined OCT volume in comparison with which the corresponding volume regions of the current OCT volume have changed by the corresponding volume regions of the newly recorded and registered OCT volume.

2. The method as claimed in claim 1, further comprising:
identifying in, or deleting from, the updated combined OCT volume, the volume regions of the updated combined OCT volume which were not combined with the volume regions of a registered current OCT volume or replaced by the volume regions of the registered current OCT volume over a predetermined time interval.

3. The method as claimed in claim 1, wherein the OCT volume is an initial OCT volume with which a first current OCT volume is combined to form a first combined OCT volume, and
wherein the OCT volume has at least one of:
a longer recording duration than individual OCT volumes of the OCT volumes recorded sequentially in time,
a representation of a larger volume region than the individual OCT volumes of the OCT volumes recorded sequentially in time, and
a higher resolution than the individual OCT volumes of the OCT volumes recorded sequentially in time.

4. The method as claimed in claim 3, wherein the initial OCT volume is recorded with a different OCT system than the one used to record the OCT volumes recorded sequentially in time.

5. The method as claimed in claim 3, further comprising:
determining a position of a respective recorded OCT volume relative to the initial OCT volume based on a comparison between structures of the object region represented in the initial OCT volume and structures of object regions represented in the OCT volumes recorded sequentially in time; and
using the position of the respective recorded OCT volume as a basis for a registration.

6. The method as claimed in claim 1, wherein relative movements between the object region and an OCT system used to record the OCT volumes recorded sequentially in time are detected and form a basis of a registration.

7. An apparatus for recording and displaying a three-dimensional OCT video, the apparatus comprising:
an OCT system configured to facilitate time-sequential recording of OCT volumes for an object region of an observation object; and
a data processing unit configured to:
combine the OCT volumes recorded sequentially in time to form a combined OCT volume;
generate display data which facilitate the display of the combined OCT volume;
register a current OCT volume of the OCT volumes recorded sequentially in time;
combine the current OCT volume with a previous combined OCT volume to generate an updated combined OCT volume;
generate display data which facilitate the display of the updated combined OCT volume;
carry out a check for combining the current OCT volume with the previous combined OCT volume and in respect of which volume regions of the current OCT volume have changed in comparison with corresponding volume regions of the previous combined OCT volume;
only combine the volume regions of the current OCT volume that have not changed with the corresponding volume regions of the previous combined OCT volume; and
replace the volume regions of the previous combined OCT volume in comparison with which the corresponding volume regions of the current OCT volume have changed with the corresponding volume regions of the current OCT volume.

8. The apparatus as claimed in claim 7, wherein the data processing unit is further configured to:
identify the volume regions of the updated combined OCT volume which were not combined with the volume regions of a registered current OCT volume or replaced by the volume regions of the registered current OCT volume over a predetermined time interval in the updated combined OCT volume; or
delete said volume regions from said updated combined OCT volume.

9. The apparatus as claimed in claim 7, wherein the data processing unit is further configured to:
use an OCT volume as an initial OCT volume with which a first current OCT volume is combined to form a first combined OCT volume,
wherein the OCT volume has at least one of:
a longer recording duration than individual OCT volumes of the OCT volumes recorded sequentially in time,
a representation of a larger volume region than the individual OCT volumes of the OCT volumes recorded sequentially in time, and
a higher resolution than the individual OCT volumes of the OCT volumes recorded sequentially in time.

10. The apparatus as claimed in claim 9, wherein, for recording of the initial OCT volume, the apparatus further comprises a second OCT system that is different from the OCT system used to record the OCT volumes recorded sequentially in time.

11. The apparatus as claimed in claim 9, wherein the data processing unit is further configured to:
determine a position of a respective current OCT volume relative to the initial OCT volume based on a comparison between structures of the object region represented in the initial OCT volume and structures of object regions represented in the OCT volumes recorded sequentially in time; and
use the position of the respective recorded OCT volume as a basis for a registration.

12. The apparatus as claimed in claim 7, wherein the apparatus further comprises a system for detecting a relative movement between the object region and the OCT system used to record the OCT volumes recorded sequentially in time, and
wherein the data processing unit is configured to use detected relative movements as a basis for a registration.

13. A computer-implemented method for generating a three-dimensional OCT video, in which OCT volumes recorded sequentially in time for an object region of an observation object are received and combined to form a combined OCT volume, the computer-implemented method comprising:
registering a current OCT volume of the OCT volumes recorded sequentially in time;

combining the current OCT volume with a previous combined OCT volume to obtain an updated combined OCT volume;

carrying out a check for combining the current OCT volume with the previous combined OCT volume, wherein the check is carried out in respect of which volume regions of the current OCT volume have changed in comparison with corresponding volume regions of the previous combined OCT volume;

combining only the volume regions of the current OCT volume that have not changed with the corresponding volume regions of the previous combined OCT volume; and replacing the volume regions of the previous combined OCT volume in comparison with which the corresponding volume regions of the current OCT volume have changed by the corresponding volume regions of the current OCT volume.

14. The computer-implemented method as claimed in claim 13, further comprising:

identifying in, or deleting from, the updated combined OCT volume, the volume regions of the updated combined OCT volume which were not combined with the volume regions of a registered current OCT volume or replaced by the volume regions of the registered current OCT volume over a predetermined time interval.

* * * * *